(12) United States Patent
Park

(10) Patent No.: US 10,223,914 B2
(45) Date of Patent: Mar. 5, 2019

(54) SYSTEM FOR SUPPORTING EMERGENCY VEHICLE USING DRONE

(71) Applicant: Mando Corporation, Pyeongtaek-si, Gyeonggi-do (KR)

(72) Inventor: Man Bok Park, Seoul (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 18 days.

(21) Appl. No.: 15/482,816

(22) Filed: Apr. 10, 2017

(65) Prior Publication Data

US 2017/0301234 A1    Oct. 19, 2017

(30) Foreign Application Priority Data

Apr. 18, 2016    (KR) .................... 10-2016-0046787

(51) Int. Cl.
*G08G 1/09* (2006.01)
*G08G 1/0965* (2006.01)
(Continued)

(52) U.S. Cl.
CPC ......... *G08G 1/0965* (2013.01); *B64C 39/024* (2013.01); *G01S 19/14* (2013.01); *G05D 1/0094* (2013.01); *G05D 1/101* (2013.01); *G08G 1/091* (2013.01); *G08G 1/094* (2013.01); *G08G 1/166* (2013.01); *G08G 5/0004* (2013.01); *G08G 5/0013* (2013.01); *G08G 5/0056* (2013.01); *G08G 5/0069* (2013.01); *H04R 27/00* (2013.01); *H04R 27/04* (2013.01); *H04W 76/50* (2018.02); *A61G 3/00* (2013.01); *A61G 3/006* (2013.01); *B64C 2201/122* (2013.01); *G08G 1/09675* (2013.01); *G08G 1/096716* (2013.01); *G08G 1/096741* (2013.01); *G08G 1/096791* (2013.01); *H04R 1/028* (2013.01); *H04R 2420/07* (2013.01); *H04W 84/005* (2013.01); *H04W 84/18* (2013.01)

(58) Field of Classification Search
CPC .................... G08G 1/0965; G01C 21/3415
See application file for complete search history.

(56) References Cited

U.S. PATENT DOCUMENTS

| | | | |
|---|---|---|---|
| 6,281,970 B1 * | 8/2001 | Williams | G01C 21/00 250/334 |
| 8,948,935 B1 * | 2/2015 | Peeters | B64C 39/024 701/3 |

(Continued)

*Primary Examiner* — Alex C Dunn
(74) *Attorney, Agent, or Firm* — Hauptman Ham, LLP

(57) ABSTRACT

Disclosed are an emergency vehicle supporting device and system using a drone that resolve forward traffic congestion on a road on which an emergency vehicle is driving via the drone and supports securing of a driving path for the emergency vehicle. According to the present invention, an emergency vehicle supporting device mounted on the emergency vehicle generates drone control information and transmits the generated drone control information to the drone. Further, the drone flies according to the drone control information and a location change of the emergency vehicle and broadcasts an avoidance warning to surrounding vehicles around the flying drone, so that the surrounding vehicles may help the emergency vehicle secure a driving path and thus the emergency vehicle may arrive at a destination within a desired time.

19 Claims, 6 Drawing Sheets

(51) Int. Cl.
    *B64C 39/02*     (2006.01)
    *G01S 19/14*     (2010.01)
    *G05D 1/10*     (2006.01)
    *G08G 5/00*     (2006.01)
    *H04R 27/00*     (2006.01)
    *G05D 1/00*     (2006.01)
    *G08G 1/16*     (2006.01)
    *H04R 27/04*     (2006.01)
    *H04W 76/50*     (2018.01)
    *A61G 3/00*     (2006.01)
    *H04R 1/02*     (2006.01)
    *G08G 1/0967*     (2006.01)
    *H04W 84/00*     (2009.01)
    *H04W 84/18*     (2009.01)

(56) References Cited

U.S. PATENT DOCUMENTS

| | | | |
|---|---|---|---|
| 8,983,682 B1* | 3/2015 | Peeters | B64C 39/024 244/190 |
| 9,505,494 B1* | 11/2016 | Marlow | B64C 39/024 |
| 9,869,560 B2* | 1/2018 | Gordon | B60W 30/00 |
| 9,875,454 B2* | 1/2018 | Kantor | G08G 5/0013 |
| 9,945,678 B2* | 4/2018 | Carter | G01C 21/3492 |
| 2016/0059962 A1* | 3/2016 | Abuelsaad | G08G 1/096716 701/3 |
| 2017/0030725 A1* | 2/2017 | Gordon | B60W 30/00 |
| 2017/0059333 A1* | 3/2017 | Ward | G01C 21/203 |
| 2017/0193828 A1* | 7/2017 | Holtzman | G08G 5/0069 |
| 2018/0080779 A1* | 3/2018 | Gordon | B60W 30/00 |

* cited by examiner

SYSTEM FOR SUPPORTING EMERGENCY VEHICLE USING DRONE

CROSS REFERENCE TO RELATED APPLICATION

This application claims priority from Korean Patent Application No. 10-2016-0046787, filed on Apr. 18, 2016, which is hereby incorporated by reference for all purposes as if fully set forth herein.

BACKGROUND OF THE INVENTION

1. Field of the Invention

The present invention relates to an emergency vehicle supporting apparatus and system for helping an emergency vehicle arrive at a destination without being influenced by surrounding circumstances such as traffic congestion.

2. Description of the Prior Art

Emergency vehicles, such as ambulances, fire engines, and police cars, should arrive at the location of an emergency situation, such as an accident or fire, as soon as possible.

Particularly, the so called "golden time", which is an early critical time to rescue people in an accident or other incident, refers to the time during which damage attributable to the accident can be minimized and as many people can be rescued as possible, and response to an accident within the golden time is very important.

For example, in first aid, cardiopulmonary resuscitation (CPR) should be commenced within 5 to 10 minutes from the time a situation occurs, and the amount of damage may vary greatly according to the time point at which firefighting begins after a fire occurs.

Accordingly, even though the emergency vehicle heading for the location of occurrence of an accident or an incident should arrive at the location within a desired time, the emergency vehicle may not arrive at the destination within the desired time due to road conditions or traffic conditions.

Specifically, the emergency vehicle is frequently unable to arrive at the desired place within the desired time due to traffic congestion, which increases fatalities and social expenses.

SUMMARY OF THE INVENTION

The present invention has been made to solve the above problems, and an aspect of the present invention is to provide an emergency vehicle supporting device and system which make an emergency vehicle arrive at a destination such as the location of occurrence of an incident within a desired time by resolving forward traffic congestion on a road on which the emergency vehicle is driving through a drone supporting the emergency vehicle.

Further, another aspect of the present invention is to provide an emergency vehicle supporting device and system which designate avoidance paths to surrounding vehicles via the drone, and thus the surrounding vehicles driving in front of the emergency vehicle may clear a driving path for the emergency vehicle without hindrance in an emergency situation.

In accordance with an aspect of the present invention, a system for supporting an emergency vehicle using a drone is provided. The system includes: the drone; and an emergency vehicle supporting device configured to acquire information on a target relative distance from the drone and a target path for the emergency vehicle from a driver of the emergency vehicle, to generate drone control information including a progress path to a destination of the emergency vehicle, the target relative distance, and the target path, and to transmit the generated drone control information and GPS information of the emergency vehicle to the drone, wherein the drone broadcasts an avoidance warning while flying based on the drone control information received from the emergency vehicle supporting device.

In the system for supporting the emergency vehicle, the drone may generate a flight path based on the drone control information and fly along the generated flight path according to a change in GPS information of the emergency vehicle.

In the system for supporting the emergency vehicle, the drone may broadcast the avoidance warning including information on the target path for the emergency vehicle and avoidance paths for surrounding vehicles driving in front of the emergency vehicle, and may be equipped with a communication device equal to an inter-vehicle communication device mounted on the emergency vehicle and transmit the avoidance warning to vehicles located within a predetermined distance from the drone through the communication device.

In accordance with another aspect of the present invention, an apparatus for supporting an emergency vehicle is provided. The apparatus includes: a supporting information acquisition unit configured to acquire information on a target relative distance from a drone and a target path for the emergency vehicle from a driver of the emergency vehicle; and a drone control information generation unit configured to generate drone control information including a progress path to a destination of the emergency vehicle, the target relative distance, and the target path and to transmit the generated drone control information and GPS information of the emergency vehicle to the drone.

In accordance with another aspect of the present invention, a drone for supporting an emergency vehicle is provided. The drone includes: a flight path generation unit configured to receive drone control information including a progress path to a destination of the emergency vehicle, a target relative distance from the emergency vehicle, and a target path for the emergency vehicle from the emergency vehicle and to generate a flight path based on the received drone control information; and a drone control unit configured to control a flight based on the generated flight path and GPS information of the emergency vehicle and to broadcast an avoidance warning on the target path for the emergency vehicle.

The present embodiments provide an emergency vehicle supporting device and system which can resolve forward traffic congestion on a road on which an emergency vehicle is driving through a drone that broadcasts an avoidance warning while flying according to control information transmitted from the emergency vehicle and secure a driving path for the emergency vehicle, thereby allowing the emergency vehicle to arrive at a desired place within a desired time.

Further, the present embodiments provide an emergency vehicle supporting device and system which can provide an avoidance warning to surrounding vehicles that drive in front of the emergency vehicle, so as to help the surrounding vehicles efficiently clear the driving path for the emergency vehicle in an emergency situation.

BRIEF DESCRIPTION OF THE DRAWINGS

The above and other objects, features and advantages of the present invention will be more apparent from the fol- FIG. 1 schematically illustrates a system configuration of an emergency vehicle supporting system using a drone according to the present embodiments.

DETAILED DESCRIPTION OF THE EXEMPLARY EMBODIMENTS

Figure 1:
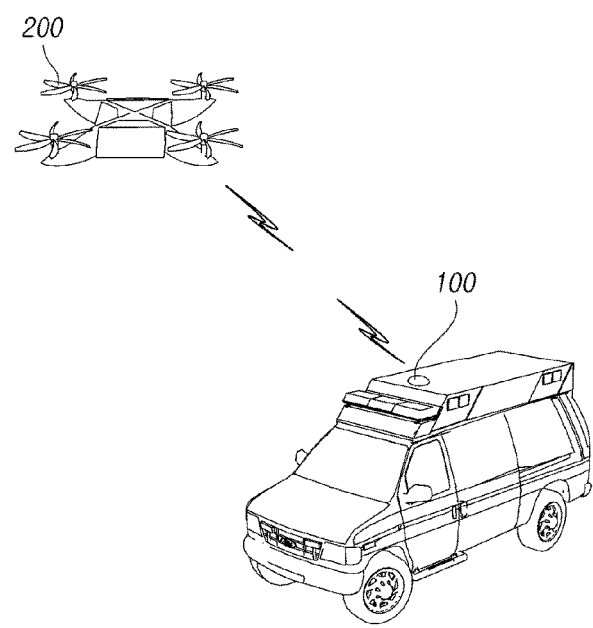

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 schematically illustrates a system configuration of a system for supporting an emergency vehicle (hereinafter, referred to as an "emergency vehicle supporting system") using a drone according to the present embodiments.

Referring to FIG. 1, the emergency vehicle supporting system according to the present embodiments includes an emergency vehicle supporting device 100 mounted on an emergency vehicle and a drone 200.

When the emergency vehicle drives in an emergency situation, the emergency vehicle supporting device 100 mounted on the emergency vehicle may transmit information according to a driver's input and a driving condition of the emergency vehicle to the drone 200, and support the drone 200 to secure a driving path for the emergency vehicle.

The emergency vehicle supporting device 100 receives information on a target relative distance between the emergency vehicle and the drone 200 and a target path for the emergency vehicle among information required for control of the drone 200 and supporting the securing of the driving path for the emergency vehicle from a driver.

Further, the emergency vehicle supporting device 100 acquires information on a destination of the emergency vehicle and a progress path to the destination from a navigation device of the emergency vehicle.

The emergency vehicle supporting device 100 may generate drone control information based on the information on the progress path for the emergency vehicle, the target relative distance between the emergency vehicle and the drone 200, and the target path for the emergency vehicle and transmit the generated drone control information to the drone 200.

At this time, the emergency vehicle supporting device 100 also transmits GPS information of the emergency vehicle. That is, the drone 200 supports securing of the driving path for the emergency vehicle while flying according to the drone control information and the GPS information of the emergency vehicle received from the emergency vehicle.

The drone 200 receives the drone control information and the GPS information of the emergency vehicle from the emergency vehicle supporting device 100. Further, the drone 200 generates a flying path thereof according to the drone control information and flies according to the generated flying path and a change in GPS information of the emergency vehicle.

That is, the drone 200 may fly over the progress path for the emergency vehicle while maintaining the target relative distance from the emergency vehicle included in the drone control information received from the emergency vehicle supporting device 100 and may support securing of the driving path for the emergency vehicle according to the target path for the emergency vehicle.

The drone 200 may support the securing of the driving path for the emergency vehicle by broadcasting an avoidance warning to surrounding vehicles driving in front of the emergency vehicle and may provide information on an avoidance path to the surrounding vehicles when broadcasting the avoidance warning to the surrounding vehicles. Further, the drone 200 may broadcast a voice message received from the driver of the emergency vehicle in real time, so that the surrounding vehicles clear the driving path.

In addition, the drone 200 may generate avoidance state information by photographing an avoidance state of the surrounding vehicles driving in front of the emergency vehicle through a camera and may transmit the generated avoidance state information to the emergency vehicle. Accordingly, the emergency vehicle may adjust the drone control information according to the avoidance state of the surrounding vehicles and may control the drone 200 according to the adjusted drone control information.

Hereinafter, the emergency vehicle supporting system according to the present embodiments will be described in detail with reference to FIG. 2.

Figure 2:
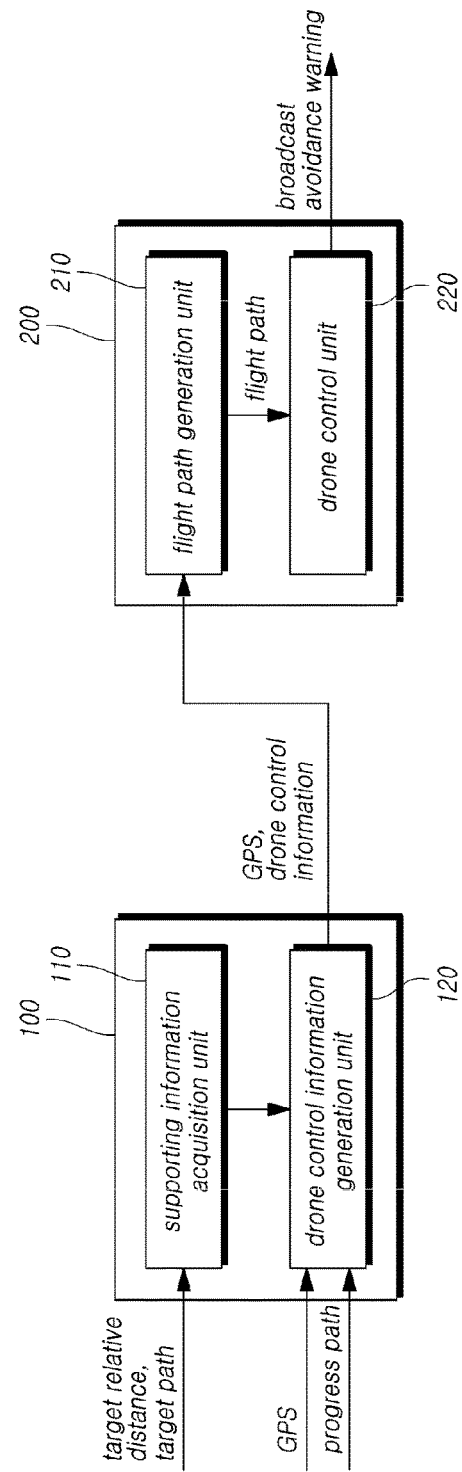
FIG. 2 is a block diagram illustrating a detailed structure of the emergency vehicle supporting system using the drone according to the present embodiments.

Referring to FIG. 2, the emergency vehicle supporting system according to the present embodiments includes the emergency vehicle supporting device 100 mounted on the emergency vehicle and the drone 200 for supporting securing of a driving path for the emergency vehicle by broadcasting an avoidance warning while flying according to control information received from the emergency vehicle supporting device 100.

The emergency vehicle supporting device 100 includes a supporting information acquisition unit 110 and a drone control information generation unit 120.

The supporting information acquisition unit 110 of the emergency vehicle supporting device 100 acquires information on a target relative distance between the emergency vehicle and the drone 200 and a target path for the emergency vehicle from a driver of the emergency vehicle.

The target relative distance between the emergency vehicle and the drone 200 refers to a distance from the emergency vehicle that is maintained while the drone 200 is flying. That is, the drone 200 may fly while maintaining a predetermined distance from the emergency vehicle according to the target relative distance acquired from the driver of the emergency vehicle.

The target relative distance may include only information on the distance between the emergency vehicle and the drone 200, or may also include information on the distance and a direction.

That is, when the target relative distance includes only the information on the distance, the drone 200 flies while maintaining a predetermined distance from the emergency vehicle in a direction that is the same as the driving direction of the emergency vehicle. When the target relative distance includes the information on the distance and the direction, the drone 200 maintains a predetermined distance from the emergency vehicle in the direction, and the direction may be input as an angle (for example, 30 degrees in a right direction) but the present invention is not limited thereto.

The target path for the emergency vehicle refers to a path that the emergency vehicle desires to secure as the driving path on a road on which the emergency vehicle is driving.

For example, on a road including four lanes, when the emergency vehicle desires to drive in a third lane, the third lane is designated as the target path. Alternatively, two lanes, such as the third lane and a fourth lane, may be designated as the target path, or a space between the two lanes, that is, the third lane and the fourth lane, may be designated as the target path.

That is, the target path refers to the path that the emergency vehicle desires to secure for actual driving, and the drone 200 supports the driving of the emergency vehicle along the target path.

When acquiring the information on the target relative distance between the emergency vehicle and the drone 200 and the target path for the emergency vehicle from the driver of the emergency vehicle, the supporting information acquisition unit 110 transfers the acquired information to the drone control information generation unit 120.

The drone control information generation unit 120 receives the information on the target relative distance between the emergency vehicle and the drone 200 and the target path for the emergency vehicle from the supporting information acquisition unit 110. Further, the drone control information generation unit 120 receives GPS information from a GPS receiver of the emergency vehicle and receives a progress path for the emergency vehicle from a navigation device of the emergency vehicle.

The progress path for the emergency vehicle refers to a path from a current location of the emergency vehicle to a set destination and corresponds to a scheduled path for the emergency vehicle to arrive at the desired destination.

The drone control information generation unit 120 generates drone control information including the target relative distance between the emergency vehicle and the drone 200 received from the supporting information acquisition unit 110, the target path for the emergency vehicle, and the progress path for the emergency vehicle. That is, when there is no new input by the driver of the emergency vehicle or no change in the destination of the emergency vehicle in the information for controlling the drone 200, the unchanged information is generated as the drone control information.

The drone control information generation unit 120 transmits the generated drone control information and GPS information of the emergency vehicle to the drone 200. Since the GPS information of the emergency vehicle corresponds to information that continuously changes according to movement of the emergency vehicle, the GPS information of the emergency vehicle is not included in the drone control information, and GPS information, which changes during the driving of the emergency vehicle, is transmitted to the drone 200 in real time.

The drone control information generation unit 120 may transmit the generated drone control information and the GPS information of the emergency vehicle to the drone 200 through an inter-vehicle communication device mounted on the emergency vehicle.

As the drone control information generation unit 120 transmits information to the drone 200 through the inter-vehicle communication device and the drone 200 broadcasts an avoidance warning while flying according to the received information, a communication area can be expanded compared to a case where the avoidance warning is directly transmitted to surrounding vehicles through the inter-vehicle communication device.

The emergency vehicle supporting device 100 may transmit the drone control information and the GPS information of the emergency vehicle to the drone 200, and may also transmit a voice message input by the driver of the emergency vehicle. That is, the emergency vehicle supporting device 100 may transmit an avoidance warning broadcast stop instruction, input by the driver of the emergency vehicle, to the drone 200.

The drone 200 may include a flight path generation unit 210 and a drone control unit 220, and may further include a communication device (not shown) that is the same as the inter-vehicle communication device mounted on the emergency vehicle.

The flight path generation unit 210 generates a flight path for the drone 200 based on the drone control information received from the emergency vehicle supporting device 100.

The flight path generation unit 210 sets an initial location of the drone 200 based on the target relative distance between the emergency vehicle and the drone 200 included in the drone control information.

A position spaced apart from the current location of the emergency vehicle by the target relative distance in a driving direction of the emergency vehicle is set as the initial location of the drone 200. Alternatively, when information on a direction is designated along with the target relative distance, a position spaced apart from the emergency vehicle by the target relative distance in the designated direction is set as the initial location of the drone 200.

The flight path generation unit 210 generates the flight path for the drone 200 based on the progress path for the emergency vehicle included in the drone control information.

The flight path for the drone 200 is set according to the progress path for the emergency vehicle from the set initial location of the drone 200 to the destination of the emergency vehicle. Accordingly, the flight path for the drone 200 may correspond to a part of the progress path for the emergency vehicle.

In the flight path generated according to the initial location of the drone 200 and the progress path for the emergency vehicle, the flight path generation unit 210 sets a flight location of the drone 200 based on the target path for the emergency vehicle included in the drone control information.

The target path for the emergency vehicle refers to a lane on the path along which the emergency vehicle desires to drive on a road currently being driven and, according to an embodiment, the drone 200 may be located and fly above a lane or a lane line corresponding to the target path for the emergency vehicle.

For example, when the road on which the emergency vehicle is driving corresponds to the fourth lane and the target path for the emergency vehicle corresponds to the third lane, the drone 200 files in the air above the third lane on the road on which the emergency vehicle is driving while being spaced apart from the emergency vehicle by the target relative distance in a driving direction of the emergency vehicle. Alternatively, when the target path for the emergency vehicle corresponds to the third lane and the fourth lane or a space between the third lane and the fourth lane, the drone 200 flies in the air over a lane line disposed between the third lane and the fourth lane.

That is, the drone 200 flies at a location spaced apart from the emergency vehicle by the target relative distance in the driving direction of the emergency vehicle, that is, a location corresponding to the target path for the emergency vehicle and broadcasts the avoidance warning, and thus surrounding vehicles driving on the target path for the emergency vehicle may effectively clear the driving path for the emergency vehicle.

According to another embodiment, the drone 200 may be located at one side of the road on which the emergency vehicle is driving and may broadcast the avoidance warning.

For example, the drone 200 may broadcast the avoidance warning while being located outside the first lane or outside the fourth lane on a four-lane road. In this case, the drone 200 does not interrupt the driving of surrounding vehicles and it is possible to prevent an accident with the surrounding vehicles that may occur due to a malfunction of the drone 200.

According to another embodiment, the drone 200 may fly over the road spaced apart from the emergency vehicle by the target relative distance while oscillating in a direction perpendicular to the direction of the road. In this case, drivers of the surrounding vehicles may visually recognize the drone 200 along with the avoidance warning, which increases the effect of the avoidance warning.

The flight path generation unit 210 transfers the flight path generated based on the drone control information to the drone control unit 220.

The drone control unit 220 controls the flight of the drone 200 based on the GPS information of the drone 200, the flight path received from the flight path generation unit 210, and the GPS information of the emergency vehicle received from the emergency vehicle supporting device 100. Further, the drone control unit 220 broadcasts an avoidance warning for securing the driving path for the emergency vehicle to surrounding vehicles.

The drone control unit 220 may identify the GPS information of the drone 200 and allow the drone 200 to fly along the flight path generated by the flight path generation unit 210.

Since the drone 200 flies while maintaining the target relative distance from the emergency vehicle, when the drone control unit 220 receives the GPS information of the emergency vehicle in real time and there is a change in GPS information of the emergency vehicle, the drone control unit 220 controls the flight of the drone 200 such that the drone 200 flies while maintaining the target relative distance from the emergency vehicle according to the movement of the emergency vehicle.

The drone control unit 220 broadcasts the avoidance warning to surrounding vehicles that are driving within a predetermined distance from the location of the drone 200 while the drone 200 is flying along the flight path generated by the flight path generation unit 210.

The avoidance warning may be transmitted to the surrounding vehicles through a communication device mounted on the drone 200, and the communication device mounted on the drone 200 may be a communication device that is the same as the inter-vehicle communication device mounted on the surrounding vehicle. Alternatively, the avoidance warning may be broadcasted through a speaker installed at the drone 200 and, at this time, a voice message of the driver of the emergency vehicle received from the emergency vehicle supporting device 100 may be broadcasted.

The avoidance warning may be information, which indicates the approach of the emergency vehicle from the rear, transferred to drivers of the surrounding vehicles. Alternatively, information on the target path for the emergency vehicle may be also transmitted along with the information indicating the approach of the emergency vehicle. Alternatively, information indicating that the emergency vehicle is approaching along the target path and information on avoidance paths for the surrounding vehicles may be provided.

For example, the avoidance warning may be the message "An emergency vehicle is approaching from the rear. Please clear the driving path." or the message "An emergency vehicle is approaching from the rear in the third lane. Please clear the driving path." Alternatively, the avoidance warning may be the message "An emergency vehicle is approaching from the rear in the third lane. Vehicles driving in the third lane, please move to the second lane or the fourth lane". At this time, when the target path for the emergency vehicle is the second lane or the third lane, the avoidance warning may be the message "Vehicles driving in the second lane, please move to the first lane and, vehicles driving in the third lane, please move to the fourth lane.".

That is, the drone control unit 220 may make the drone 200 fly at a predetermined location along the target path for the emergency vehicle on the flight path generated by the flight path generation unit 210, may broadcast the avoidance warning to surrounding vehicles in various ways, such as via a voice message, a text message, and an alarm, and may also broadcast the avoidance warning including information on the target path for the emergency vehicle and the avoidance paths for the surrounding vehicles.

When the distance between the current location of the emergency vehicle and the destination of the emergency vehicle corresponds to the target relative distance of the drone 200, the drone control unit 220 may stop the movement of the drone 200 and broadcast the avoidance warning while the drone 200 is hovering in place.

When the emergency vehicle arrives at the destination or the drone control unit 220 receives an avoidance warning stop instruction from the emergency vehicle supporting device 100, the drone control unit 220 stops broadcasting the avoidance warning. Further, the drone control unit 220 stops controlling the drone 200 according to an instruction received from the emergency vehicle supporting device 100.

After broadcasting the avoidance warning according to control of the emergency vehicle, the drone control unit 220 may photograph avoidance states of the surrounding vehicles that drive in front of the emergency vehicle through a camera installed in the drone 200.

Further, the drone control unit 220 generates avoidance state information based on the photographed avoidance states of the surrounding vehicles and transmits the generated avoidance state information to the emergency vehicle supporting device 100.

Accordingly, the emergency vehicle supporting device 100 may receive the avoidance state information acquired by the drone 200 and adjust the drone control information according to the received avoidance state information, so as to control the drone 200.

For example, in the avoidance state identified through the avoidance state information, the emergency vehicle supporting device 100 may control the drone 200 to move to a position where the driving path for the emergency vehicle is not secured and to broadcast the avoidance warning.

That is, when a driving path far away from the emergency vehicle is secured but the driving path near the emergency vehicle is not secured, the emergency vehicle supporting device 100 adjusts the target relative distance included in the drone control information to be shorter and transmits the adjusted target relative distance to the drone 200. Conversely, when the driving path near the emergency vehicle is secured but the driving path far away from the emergency vehicle is not secured, the emergency vehicle supporting device 100 adjusts the target relative distance included in the drone control information to be longer and transmits the adjusted target relative distance to the drone 200.

Alternatively, when it is determined that it is not easy to secure the initially set target path and the number of surrounding vehicles located in adjacent lanes is relatively small based on the avoidance state information, the emergency vehicle supporting device 100 may change the target path and transmit drone control information including the changed target path to the drone 200.

According to the present embodiments, until the emergency vehicle arrives at the desired destination, the emergency vehicle controls the flight of the drone 200 and the broadcasting of the avoidance warning through the emergency vehicle supporting device 100 mounted on the emergency vehicle. Further, the drone 200 broadcasts the avoidance warning while flying on the road in front of the emergency vehicle and thus surrounding vehicles clear the driving path for the emergency vehicle, so that the emergency vehicle can arrive at the desired place within the desired time without a delay attributable to traffic congestion.

Figure 3:
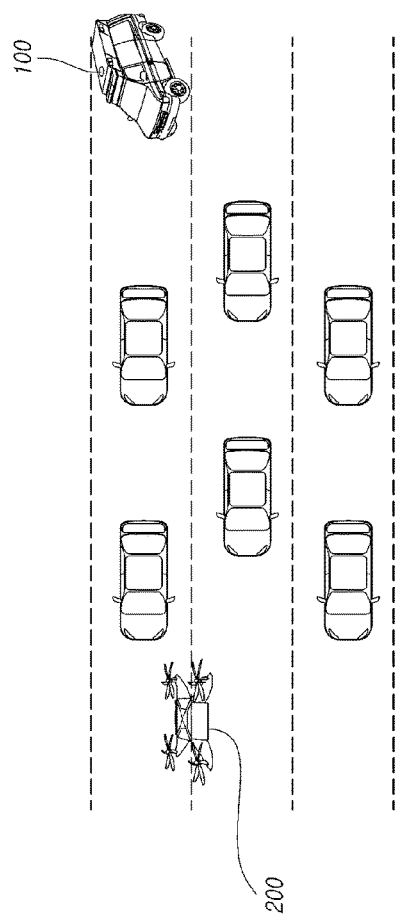
FIGS. 3 and 4 illustrate examples in which forward traffic congestion on a road on which the emergency vehicle is driving is resolved by the emergency vehicle supporting system using the drone according to the present embodiments.
Figure 4:
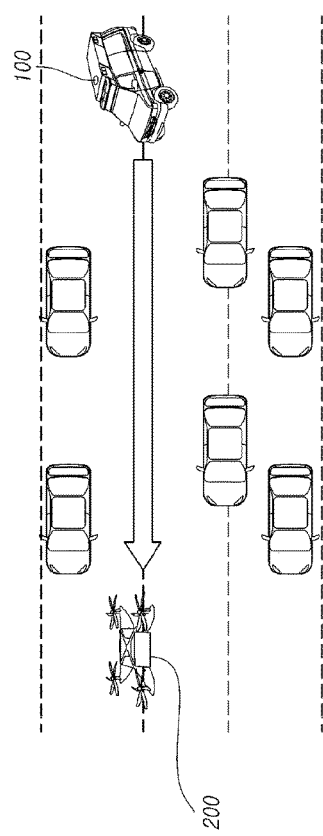

FIGS. 3 and 4 illustrate examples where the emergency vehicle drives without any influence of traffic congestion by the emergency vehicle supporting system according to the present embodiments.

Referring to FIG. 3, traffic congestion occurs in front of the emergency vehicle in the state in which the emergency vehicle equipped with the emergency vehicle supporting device 100 drives. In this case, the emergency vehicle cannot arrive at a destination within a desired time due to the forward traffic congestion.

The present embodiments provide a method of securing a progress path for the emergency vehicle via the drone 200.

The emergency vehicle supporting device 100 generates drone control information including a progress path for the emergency vehicle, a target relative distance between the emergency vehicle and the drone 200, and a target path for the emergency vehicle as information for controlling the drone 200 and transmits the generated drone control information to the drone 200.

For example, the emergency vehicle supporting device 100 may generate the drone control information including the target relative distance designated as 100 m and the target path designated as between a second lane and a third lane and may transmit the generated drone control information to the drone 200.

When receiving the drone control information, the drone 200 calculates a flight path and a flight location of the drone 200 based on the progress path for the emergency vehicle, the target relative distance from the emergency vehicle, and the target path for the emergency vehicle.

That is, the drone 200 may fly in the air above a lane line between the second lane and the third lane spaced apart from the emergency vehicle by 100 m in a direction of the progress path for the emergency vehicle.

The drone 200 flies along the flight path for the drone 200 according to a change in GPS information received from the emergency vehicle supporting device 100. Further, an avoidance warning is broadcasted to surrounding vehicles that drive around the drone 200.

At this time, an avoidance warning including avoidance paths for the surrounding vehicles may be broadcasted and, for example, the drone 200 may broadcast the avoidance warning to vehicles driving in the second lane to move to the left and to vehicles driving in the third lane to move to the right.

FIG. 4 illustrates the situation after the drone 200 broadcasts the avoidance warning while flying according to control of the emergency vehicle supporting device 100 in the state of FIG. 3.

Referring to FIG. 4, as surrounding vehicles that drive in the second lane and the third lane moves to the left and the right, respectively, a space between the second lane and the third lane corresponding to the target path for the emergency vehicle may be secured as the progress path for the emergency vehicle.

According to the present embodiments, the emergency vehicle may arrive at the desired destination within the desired time as the drone 200 supports the securing of the driving path for the emergency vehicle through communication between the emergency vehicle supporting device 100 and the drone 200.

Further, the surrounding vehicles move according to the avoidance path included in the avoidance warning of the drone 200, so that drivers of the surrounding vehicles may help the emergency vehicle secure the driving path in an emergency situation without hindrance.

Figure 5:
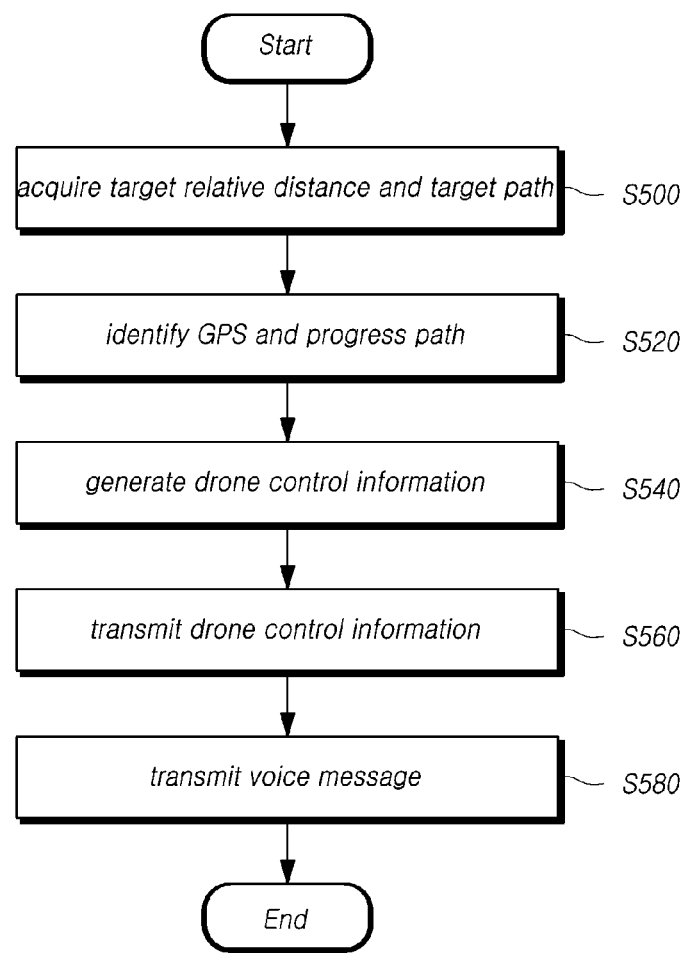
FIG. 5 is a flowchart illustrating a process of an emergency vehicle supporting method according to the present embodiments.

FIG. 5 illustrates a process of an emergency vehicle supporting method of the emergency vehicle supporting device 100 according to the present embodiments.

The emergency vehicle supporting device 100 according to the present embodiments acquires information on a target relative distance between the emergency vehicle and the drone 200 and a target path for the emergency vehicle from the driver of the emergency vehicle in S500. Further, the emergency vehicle supporting device 100 identifies GPS information from a GPS receiver of the emergency vehicle and identifies a progress path to a destination of the emergency vehicle from a navigation device of the emergency vehicle in S520.

The emergency vehicle supporting device 100 generates drone control information based on the progress path for the emergency vehicle, the target relative distance between the emergency vehicle and the drone 200, and the target path for the emergency vehicle in S540.

The emergency vehicle supporting device 100 transmits the generated drone control information to the drone 200 in S560. Further, the emergency vehicle supporting device 100 transmits the GPS information of the emergency vehicle to the drone 200 in real time.

At this time, when there is a change in the information included in the drone control information, for example, when there is a change in the progress path for the emergency vehicle due to a change in the set destination or path or there is a change in the target relative distance or the target path input by the driver, the emergency vehicle supporting device 100 transmits drone control information generated by the changed information to the drone 200.

The drone 200 may broadcast an avoidance warning while flying according to the drone control information transmitted by the emergency vehicle supporting device 100 and the GPS information of the emergency vehicle and may transmit a voice message of the driver to broadcast the voice message as the avoidance warning in S580.

Figure 6:
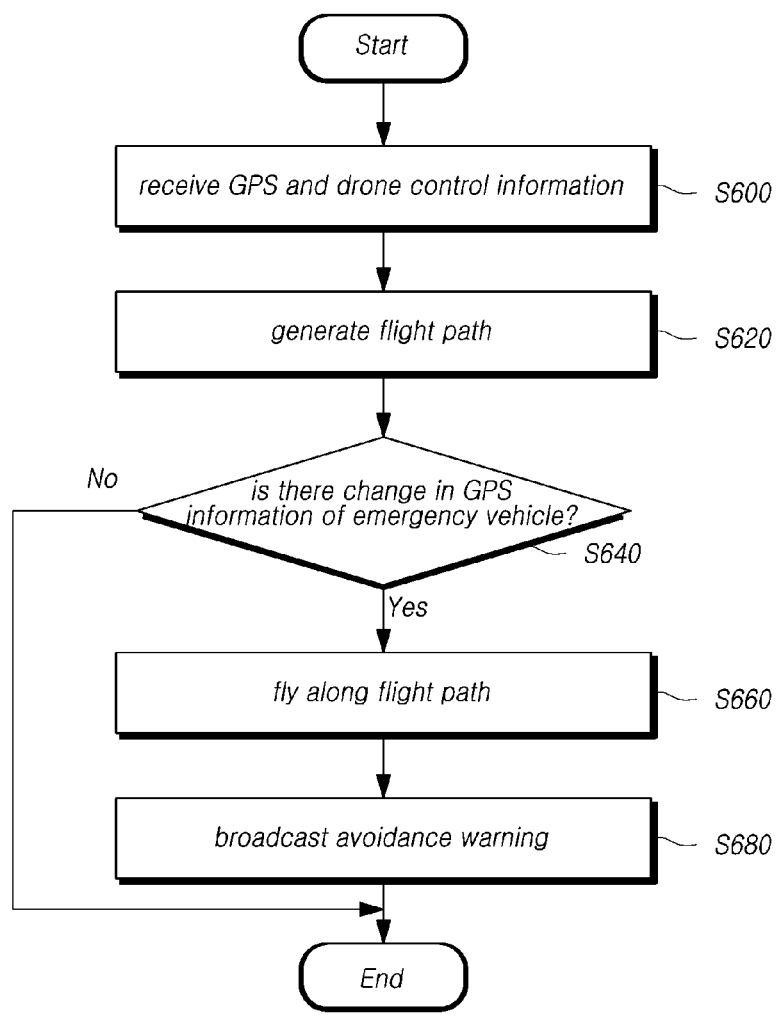
FIG. 6 is a flowchart illustrating a process of a control method of the drone that supports the emergency vehicle according to the present embodiments.

FIG. 6 illustrates a process of a control method of the drone 200 that supports the emergency vehicle according to the present embodiments.

The drone 200 supporting the emergency vehicle according to the present embodiments receives drone control information and GPS information of the emergency vehicle from the emergency vehicle supporting device 100 in S600.

The drone control information includes information on a progress path for the emergency vehicle, a target relative distance between the emergency vehicle and the drone 200, and a target path for the emergency vehicle.

The drone 200 generates a flight path for the drone 200 based on the progress path for the emergency vehicle and the target relative distance included in the drone control information and sets a flight location of the drone 200 based on the target path for the emergency vehicle in S620. That is, a flight path along which the drone 200 flies is generated.

When GPS information received from the emergency vehicle in real time is changed in S640, that is, when the emergency vehicle moves, the drone 200 flies along the flight path generated by the drone 200 while maintaining the target relative distance from the emergency vehicle according to the change in the location of the emergency vehicle in S660.

The drone 200 broadcasts an avoidance warning to surrounding vehicles that drive around the drone 200 while flying along the flight path in S680.

The broadcasted avoidance warning may include information on the target path for the emergency vehicle or the avoidance paths for the surrounding vehicles and the surrounding vehicles may clear the driving path for the emergency vehicle according to the avoidance warning broadcasted by the drone 200, so that the emergency vehicle can arrive at the destination within the desired time.

Although the exemplary embodiments of the present invention have been described for illustrative purposes, those skilled in the art will appreciate that various modifications and substitutions are possible, without departing from the scope and spirit of the invention as disclosed in the accompanying claims. Therefore, the exemplary embodiments disclosed in the present invention are intended to illustrate the scope of the technical idea of the present invention, and the scope of the present invention is not limited by the exemplary embodiments.

What is claimed is:

1. An apparatus for supporting an emergency vehicle, the apparatus comprising:
   a supporting information acquisition unit configured to receive signals for (i) information on a target relative distance from a drone and (ii) information on a target path for the emergency vehicle from a driver of the emergency vehicle; and
   a drone control information generation unit configured to generate, in response to the received signals, drone control information including a progress path to a destination of the emergency vehicle, the target relative distance, and the target path and
   transmit the generated drone control information and GPS information of the emergency vehicle to the drone, and
   control the drone to
      fly in the target relative distance away from the emergency vehicle, and
      remotely broadcast an avoidance warning to surrounding vehicles which drive in front of the emergency vehicle, the avoidance warning including information on the target path for the emergency vehicle and avoidance paths for the surrounding vehicles.

2. The apparatus of claim 1, wherein the drone control information generation unit controls the drone to generate a flight path for the drone based on the drone control information transmitted to the drone and to fly along the generated flight path according to a change in the GPS information of the emergency vehicle.

3. The apparatus of claim 1, wherein the drone control information generation unit controls the drone to fly above a lane or a lane line corresponding to the target path for the emergency vehicle while maintaining the target relative distance from the emergency vehicle.

4. The apparatus of claim 1, wherein the drone control information generation unit transmits a voice message of a driver of the emergency vehicle to the drone and controls the drone to broadcast the voice message in real time.

5. The apparatus of claim 1, wherein the drone control information generation unit receives feedback of avoidance state information of surrounding vehicles that drive in front of the emergency vehicle from the drone.

6. The apparatus of claim 5, wherein the drone control information generation unit generates drone control information, of which at least one of the progress path to the destination, the target relative distance, and the target path is changed based on the received feedback of the avoidance state information and transmits the drone control information to the drone.

7. A drone for supporting an emergency vehicle, the drone comprising:
   a flight path generation unit configured to
      receive signals for drone control information including (i) a progress path to a destination of the emergency vehicle, (i) a target relative distance from the emergency vehicle, and (iii) a target path for the emergency vehicle from the emergency vehicle, and
      generate a flight path based on the received signals for drone control information; and
   a drone control unit configured to
      control a flight in the target relative distance away from the emergency vehicle, based on the generated flight path and GPS information of the emergency vehicle, and
      broadcast an avoidance warning to surrounding vehicles which drive on the target path for the emergency vehicle.

8. The drone of claim 7, wherein the drone control unit controls a flight above a lane or a lane line corresponding to the target path for the emergency vehicle while maintaining the target relative distance from the emergency vehicle.

9. The drone of claim 7, wherein the drone control unit broadcasts the avoidance warning including information on the target path for the emergency vehicle and avoidance paths for surrounding vehicles that drive in front of the emergency vehicle.

10. The drone of claim 7, wherein the drone control unit broadcasts the avoidance warning to the surrounding vehicles located within a predetermined distance from the drone through a communication device identical to an inter-vehicle communication device mounted on the emergency vehicle.

11. The drone of claim 7, wherein the drone control unit acquires avoidance state information of surrounding vehicles driving in front of the emergency vehicle and transmits the avoidance state information to the emergency vehicle.

12. The drone of claim 11, wherein, when the avoidance state information is transmitted to the emergency vehicle, the drone control unit receives drone control information, of which at least one of the progress path to the destination of the emergency vehicle, the target relative distance from the emergency vehicle, and the target path for the emergency vehicle is changed, from the emergency vehicle and controls a flight based on the received drone control information.

13. A system for supporting an emergency vehicle using a drone, the system comprising:
the drone; and
an emergency vehicle supporting device configured to
receive signals for (i) information on a target relative distance from a drone and (ii) information on a target path for the emergency vehicle from a driver of the emergency vehicle,
generate, in response to the received signals, drone control information including a progress path to a destination of the emergency vehicle, the target relative distance, and the target path, and
transmit the generated drone control information and GPS information of the emergency vehicle to the drone,
wherein the emergency vehicle supporting device is configured to control the drone to remotely broadcast an avoidance warning to surrounding vehicles which drive in front of the emergency vehicle while the drone is controlled to be flying in the target relative distance away from the emergency vehicle based on the drone control information received from the emergency vehicle supporting device.

14. The system of claim 13, wherein the drone generates a flight path based on the drone control information and flies along the generated flight path according to a change in GPS information of the emergency vehicle.

15. The system of claim 13, wherein the drone flies over a lane or a lane line corresponding to the target path for the emergency vehicle while maintaining the target relative distance from the emergency vehicle.

16. The system of claim 13, wherein the drone broadcasts the avoidance warning including information on the target path for the emergency vehicle and avoidance paths for the surrounding vehicles driving in front of the emergency vehicle.

17. The system of claim 13, wherein the drone is equipped with a communication device equal to an inter-vehicle communication device mounted on the emergency vehicle and transmits the avoidance warning to vehicles located within a predetermined distance from the drone through the communication device.

18. The system of claim 13, wherein the drone receives a voice message of the driver of the emergency vehicle and broadcasts the received voice message in real time.

19. The system of claim 13, wherein the emergency vehicle supporting device transmits an avoidance warning broadcast stop instruction of the drone to the drone according to an input of the driver of the emergency vehicle.

* * * * *